United States Patent

[11] 3,536,056

| [72] | Inventor | Raymond L. Dills<br>Louisville, Kentucky |
|---|---|---|
| [21] | Appl. No. | 785,224 |
| [22] | Filed | Dec. 19, 1968 |
| [45] | Patented | Dec. 27, 1970 |
| [73] | Assignee | General Electric Company<br>a corporation of New York. |

[54] SELF-CLEANING, CATALYTIC COATED, COOKING OVEN
3 Claims, 5 Drawing Figs.

[52] U.S. Cl. ................................................. 126/19
[51] Int. Cl. ................................................. A21b 1/00
[50] Field of Search .................................. 126/19, 21, 21(A); 219/400

[56] References Cited
UNITED STATES PATENTS
2,746,448  5/1956  Holmsten ............... 126/19
3,266,477  8/1966  Stiles ...................... 126/19
3,302,000  1/1967  Sherman ................. 126/19X
3,425,405  2/1969  Dills ....................... 126/19
3,465,125  9/1969  McArthur ............... 126/21X Primary Examiner—Charles J. Myhre
Attorneys—Richard L. Caslin, Harry F. Manbeck, Jr., Oscar B. Waddel and Frank L. Neuhauser ABSTRACT: This invention relates to a cooking oven having walls forming a cooking cavity, the exposed surfaces of most of the enameled walls of the oven cavity are coated with an oxidizing catalyst to reduce the effective temperature of the oxidizing reaction and speed up the rate of decomposition of food soil and grease spatter that accumulates on the oven walls during normal cooking operations. An auxiliary heating means is located beneath the oven bottom wall to heat the bottom wall much hotter than the existing oven air temperature so as to render the catalyst effective in oxidizing the soil when spillage accumulates on the floor of the oven.

Patented Oct. 27, 1970

INVENTOR.
RAYMOND L. DILLS
BY Richard L. Cash
HIS ATTORNEY

INVENTOR.
RAYMOND L. DILLS
BY Richard L. Cash
HIS ATTORNEY

SELF-CLEANING, CATALYTIC COATED, COOKING OVEN

CROSS-REFERENCE TO RELATED PATENTS

The present invention is an improvement over the catalytic coated oven disclosed in the U.S. Pat. of Alvin B. Stiles No. 3,266,477. It is old to apply an oxidizing catalyst to the exposed walls forming an oven cavity, but prior to this invention no one has been able to take advantage of the catalytic coating on the bottom wall of the oven because the largest amount of spillage tends to accumulate on the bottom wall and acts to smother the catalytic action and render it ineffective for the bottom wall. The natural impulse then would be for the housewife to scrub the food soil off the bottom wall as she would do in a standard oven. This abrasive action would scrape off some of the catalyst coating and reduce its ability in the future to degrade the food soil at relatively low temperature. This partial deterioration of the catalytic coating would then tend to accelerate and render the catalytic process inoperative for automatic self-cleaning of the oven walls.

BACKGROUND OF THE INVENTION

It has long been recognized that one of the most disagreeable housekeeping chores which a housewife must perform is that of scouring the inner walls of her oven of accumulated food soils. To make this task less burdensome, various oven cleaning aids and chemical compounds have come into wide use. Probably the most convenient of these is the special oven design utilizing a pyrolytic method of cleaning the walls of the oven by raising the temperature of the walls into a heat-cleaning temperature range somewhere between about 750°F. and about 950°F. At these temperatures, the food soils are degraded into gaseous products which are then discharged from the oven cavity. The details of this cleaning method and of the nature of the oven design in which it may be carried out are fully disclosed in the U.S. Pat. of Bohdan Hurko No. 3,121,158, which is also assigned to the General Electric Company, the assignee of the present invention.

A long sought-after objective has been to lower the maximum operating temperature of the self-cleaning oven process. One possibility is discussed in the U.S. Pat. of Alvin B. Stiles No. 3,266,477 which discloses the use of an oxidizing catalyst on the exposed surfaces of the walls forming the oven cavity whereby under optimum conditions the food soil and grease spatter may oxidize at a reasonable rate at temperatures between about 500°F. and 700°F. However, such a catalytic process will inherently be many orders of magnitude slower than the pyrolytic process of the Hurko patent. One of the primary drawbacks in such a catalytic process is that when there is heavy spillage of the food soil and grease spatter on the bottom wall of the oven the catalyst becomes smothered and the catalyst is rendered ineffective in performing its intended function.

The principal object of the present invention is to provide a cooking oven with a bottom wall having an oxidizing catalyst coating on the exposed surface thereof with special heating means for raising the temperature of the bottom wall to several hundred degrees higher than the oven air temperature for rendering the catalytic action effective under all cooking conditions.

A further object of the present invention is to provide a cooking oven having walls which may be cleaned of food soil and grease spatter by the action of an oxidizing catalyst formed on the exposed surface of the walls wherein the bottom wall is provided with an auxiliary heater which is energized whenever the oven is operating for raising the bottom wall temperature several hundred degrees above the oven ambient temperature.

A still further object of the present invention is to provide a cooking oven of the class described wherein the bottom wall is provided with depressions that cooperate with the auxiliary heating means for concentrating the food soil and grease spatter in the vicinity of the auxiliary heater so that the entire bottom wall cannot be smothered by the food soil.

SUMMARY OF THE INVENTION

The present invention, in accordance with one form thereof, relates to a cooking oven having walls forming a cooking cavity where the exposed surfaces of most of the walls of the oven are coated with an oxidizing catalyst to reduce the effective temperature of the oxidizing reaction and speed up the rate of decomposition of the food soil and grease spatter that accumulates on the oven walls. An auxiliary heating means is located beneath the bottom wall to raise the bottom wall temperature several hundred degrees hotter than the oven ambient temperature so as to render the catalyst on the bottom wall effective in oxidizing the soil when spillage accumulates on the floor of the oven.

BRIEF DESCRIPTION OF THE DRAWINGS

My invention will be better understood from the following description taken in conjunction with the accompanying drawings, and its scope will be pointed out in the appended claims.

DESCRIPTION OF THE PREFERRED EMBODIMENTS

Figure 1:
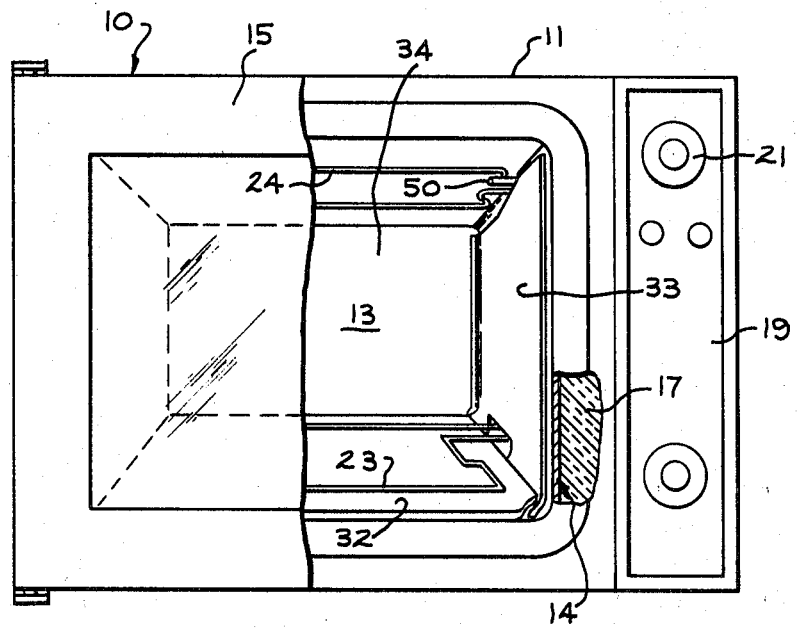
FIG. 1 is a front perspective view of an eye-level oven having the exposed surfaces of removable panels forming the oven cavity coated with an oxidizing catalyst.

Turning now to a consideration of the drawings and in particular to FIG. 1, there is shown for illustrative purposes an eye-level or counter-top mounted electric oven 10 having an outer cabinet structure 11, an oven cavity 13 formed by a boxlike oven liner 14 and a front-opening access door 15. Surrounding the oven liner is a blanket 17 of heat insulating material such as fiber glass or the like for retaining the heat generated for the oven cooking process. To the right of the oven is shown a front control panel 19 which covers up a wiring compartment therebehind and supports a number of oven control components 21 which include such items as an oven selector switch, an oven thermostat, an oven timer and the like, all as is standard in this art. The oven is heated by a standard baking element 23 in the bottom portion of the oven and a standard broiling element 24 in the top portion.

Figure 2:
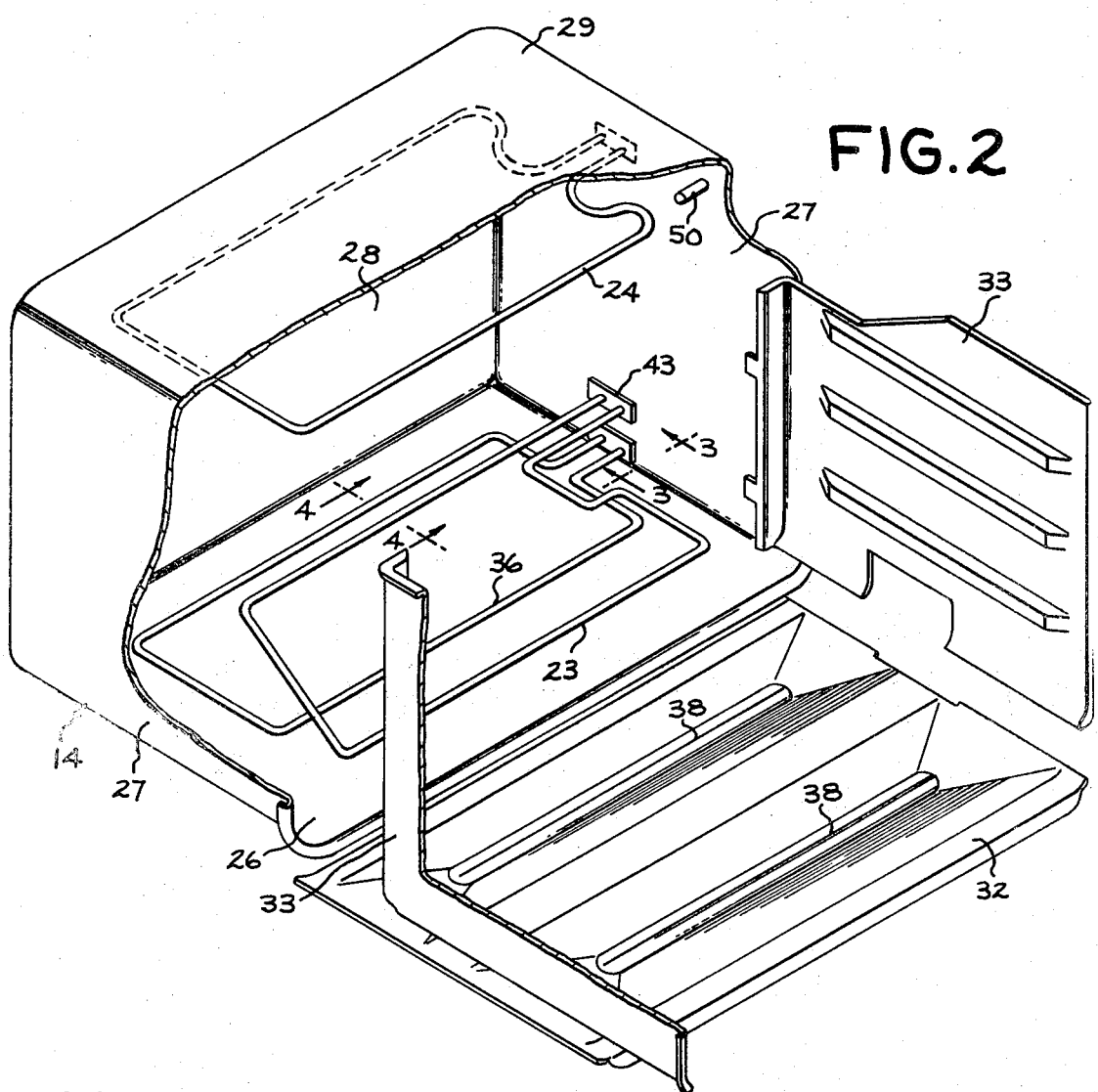
FIG. 2 is an exploded perspective view of the oven construction of FIG. 1 showing several of the removable wall panels with special attention given to the removable bottom panel which has depressions formed therein to accumulate food soil and grease spatter in narrow troughs. Moreover, the oven is shown with a standard baking element in the bottom, a standard broiling element in the top, and an auxiliary heating element which is adapted to underlie the removable bottom panel in the vicinity of the depressions or troughs.
Figure 3:
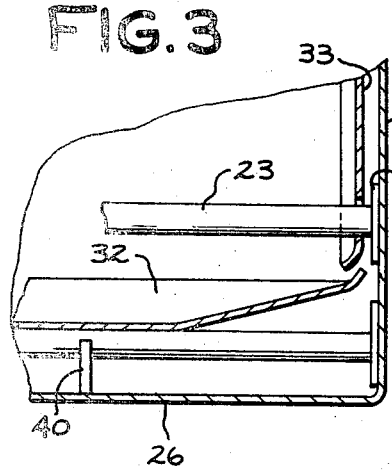
FIG. 3 is a fragmentary, cross-sectional, elevational view taken through the bottom of the oven at the right side thereof on the line 3—3 of FIG. 2.

As is best seen in FIG. 2, the boxlike oven liner 14 includes a bottom wall 26, opposite side walls 27, a rear wall 28 and a top wall 29. Turning back to the perspective view of FIG. 1, a set of removable panels are provided for the oven to substantially cover the walls of the oven liner; for example, there is a bottom panel 32, opposite side panels 33, 33, and a back panel 34. No panel is felt needed at the top of the oven over the broiling element 24. Only three of the four removable panels are shown in FIG. 2; namely, the bottom panel 32 and the two side panels 33. In the preferred embodiment, the exposed surfaces of these removable panels are adapted to be coated with an oxidizing catalyst of the general type as is disclosed in the above-cited Stiles U.S. Pat. No. 3,266,477. One reason for putting the catalyst on the removable panels rather than directly on the oven liner is to facilitate the ease of replacing the catalytic coating after a long period of intended usage without having to replace the entire oven liner 14. It is understandable that the catalyst may be applied either to the exposed surfaces of the oven liner or to removable oven panels as shown in the drawings of this application, as a mere matter of preference.

The drawings do not show all of the details of mounting the removable panels 32—34 to the walls of the oven liner 14 for this does not form part of the present invention. A satisfactory mounting means for the panels is taught in my pending patent application Ser. No. 669,428, which is likewise assigned to the assignee of the present invention.

As mentioned previously one of the shortcomings of the catalytic process for cleaning food soil and grease spatter from the walls of the cooking oven is that the catalytic material must be exposed to be effective, and it will not withstand very much abrasion before it begins to flake off. In other words, the housewife should not use strong chemical cleaning agents or a hard rubbing action on the catalytic surface otherwise the coating will wear off rapidly down to the supporting substrate, which in most cases would be of porcelain enamel finish on sheet steel or aluminized steel. Hence, it is imperative to develop a design which will automatically oxidize the food soil and grease spatter on a continuing basis so that the housewife will not be tempted to accelerate the cleaning action by scraping off or wiping off the soil.

Figure 4:
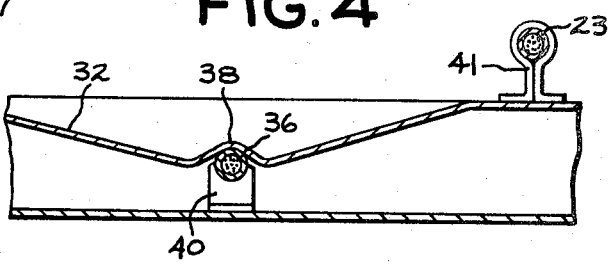
FIG. 4 is a fragmentary, cross-sectional, elevational view taken on the line 4—4 of FIG. 2 and showing the relationship between the lower baking element, the depressions in the removable bottom panel of the oven and the underlying auxiliary heating element.

The present invention is directed mainly to the area of the bottom or floor of the oven which receives most of the food spillage and grease spatter that is generated during the cooking operation. Notice in FIG. 2 that there are two heating elements in the bottom of the oven. The first heating element 23, which was mentioned earlier, is the standard baking element, while the second element 36 is an auxiliary heating element which is adapted to be disposed beneath the bottom panel 32 as is best seen in FIG. 4. The auxiliary heating element 36 is a metal sheathed resistance heating element, the same as the baking element 23 and broiling element 24, and it is also of looped configuration. Hovever, it does not coincide with the shape and position of the baking element 23. Instead it is purposely designed to be offset or out of phase of the baking element. The bottom panel 32 is provided with a pair of depressions or troughs 38 which extend substantially from one side to the other of the bottom panel, and the bottom of each depression overlies the main extent of the auxiliary heater 36. Both the auxiliary heater 36 and the baking element 23 are each provided with clips or supporting feet 40 and 41 respectively which support the auxiliary heating element from the bottom wall 26 of the oven liner and the baking element from the bottom panel 32. The baking element 23 is preferably a hinged member having a terminal plate 43 mounted in the right side wall 27 of the oven liner. Thus the bottom panel 32 may be assembled in the oven by raising the baking element 23 slightly and slipping the panel between the baking element 23 and the auxiliary heater 36.

The top surface of the bottom wall 26 of the oven liner may have a reflective surface to direct radiant energy back up to the bottom of panel 32. Moreover, the underside of the panel 32 should be left with a black enamel undercoat so as to be a black body and absorb more heat.

The principal advantage of the depressions is that they serve as reservoirs to collect the food soil and grease spatterings such that the entire bottom panel 32 does not become covered and the catalyst smothered by the soil. Assuming that a pool of grease builds up within the depressions 38, it should be understood that the remaining areas of the bottom panel have the catalytic coating exposed and therefore the food soil is degraded and this cleaning action tends to work against the edge of the pool of grease in the depression until the pool is completely evaporated.

Figure 5:
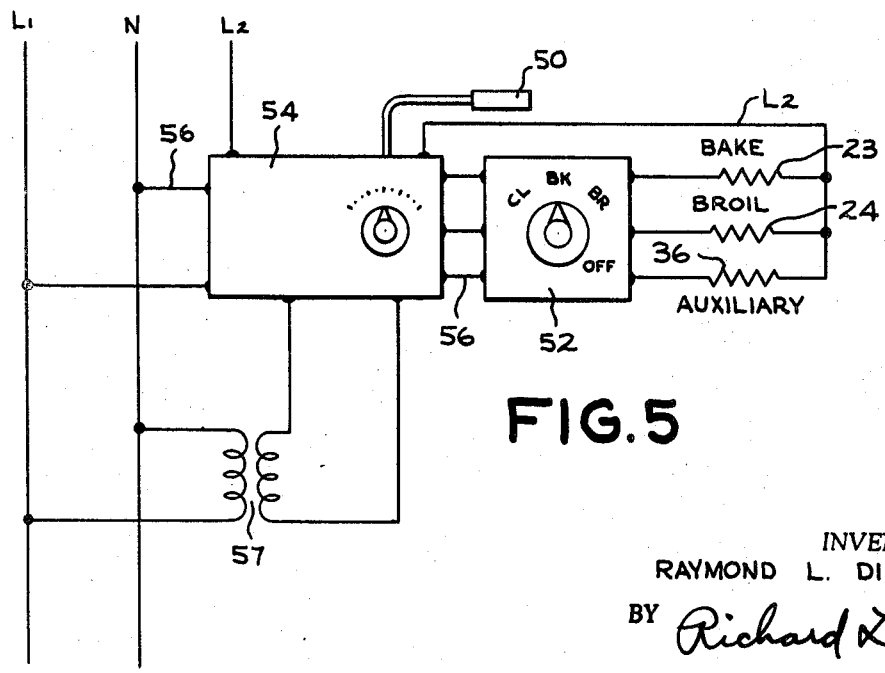
FIG. 5 is a block circuit diagram of the control and power circuit for the oven.

The block circuit diagram of FIG. 5 includes a three-wire source of electrical power of 236 volts, single phase, 60 cycle, AC provided with a pair of line conductors $L_1$ and $L_2$ and a grounded neutral conductor N. This circuit is controlled by a manually settable oven selector switch 52, and a manually settable oven thermostat 54 which are interposed between the power source and the heating elements or load 23, 24 and 26 by means of leads 56. A low voltage control circuit is extablished for the thermostat 54 by connecting a step-down transformer 57 across line $L_1$ and neutral conductor N for feeding the thermostat, as is conventional in this art. The thermostat 54 includes a temperature sensor 50 in the oven and a manually settable responder preferably located in the control panel 19. The responder includes but does not show in its block diagram a power relay for opening or closing switch contacts in the line wires $L_1$ and $L_2$. An oven selector switch 52 has a dial which is settable to either an OFF, a BAKE, a BROIL or perhaps a CLEAN position.

The oven temperature control includes a temperature sensor 50 as for example of the rod and tube type located in the top front of the oven cavity which allows baking or roasting with a hot bottom panel 32 above oven ambient temperature, yet will still bake or roast. Moreover, after the bottom panel 32 is heated up to temperature, the bake unit 23 may be cycled off, leaving the auxiliary heating element 36 and the hot bottom panel 32 to supply bottom heat to the food being cooked. The control circuit may include a special CLEAN cycle wherein only the bake element 23 and the auxiliary heater 36 are energized for heating and cleaning only the bottom panel 32.

Modifications of this invention will occur to those skilled in this art. Therefore, it is to be understood that this invention is not limited to the particular embodiments disclosed but that it is intended to cover all modifications which are within the true spirit and scope of this invention as claimed.

I claim:

1. A cooking oven comprising in combination a boxlike oven liner and a front-opening access door, said oven liner having a bottom wall, opposite side walls, a rear wall and a top wall, a set of removable panels covering the bottom wall, the side walls and the rear wall, means for supporting the removable panels in place, a baking element supported adjacent the removable bottom panel and a broiling element located adjacent the top wall of the oven liner, and an additional heating element located between the bottom wall of the oven liner and the removable bottom panel, means for selectively controlling the energization of the bake, broil and additional heating elements, said bottom panel being formed with depressions which substantially overlie the additional heating element whereby the depressions serve to accumulate much of the food soil and grease spatter which falls to the floor of the oven, a coating of an oxidizing catalyst covering the exposed surface of at least the bottom panel, said additional heating element being energized whenever any one or both of the baking and broiling elements are energized whereby the bottom panel is heated to a temperature between about 500°F. and 700°F whenever the oven is operating so as to render the catalyst effective in oxidizing the food soil and grease spatter on the bottom panel.

2. A cooking oven as recited in claim 1 wherein all of the removable panels have a coating of an oxidizing catalyst covering the exposed surfaces thereof.

3. A cooking oven comprising walls forming a boxlike oven liner and a front-opening access door, said oven liner having a bottom wall, opposite side walls, a rear wall and top wall, a removable panel overlying the bottom wall, a coating of an oxidizing catalyst covering the exposed surface of the removable panel, a baking element supported adjacent the top of the removable panel and a broiling element supported adjacent the top wall of the oven liner, and an auxiliary heating element located beneath the removable panel, the said panel being formed with depressions which substantially overlie the auxiliary heating element whereby the depressions serve to concentrate much of the food soil and grease spatter which falls on the panel, said auxiliary heating element being energized whenever any one or both of the baking and broiling elements are energized whereby the removable panel is heated to a temperature between about 500°F. and 700°F. whenever the oven is operating so as to render the catalyst effective in oxidizing the soil and grease spatter on the removable panel into gaseous degradation products.